United States Patent [19]
Sherrod

[11] Patent Number: 5,903,943
[45] Date of Patent: May 18, 1999

[54] MODULAR DOCKBOARD

[75] Inventor: Danny G. Sherrod, Joshua, Tex.

[73] Assignee: Bluff Manufacturing, Inc., Tex.

[21] Appl. No.: 08/796,804

[22] Filed: Feb. 6, 1997

[51] Int. Cl.$^6$ .................................................. E01D 15/12
[52] U.S. Cl. .............................. 14/2.4; 14/69.5; 52/570; 52/592.1
[58] Field of Search ........................... 14/2.4, 69.5, 71.1, 14/73, 77.1; 404/28, 29, 53, 73; 446/124, 125, 127, 128, 120, 476, 118; 52/592.1, 570, 603, 422

[56] References Cited

U.S. PATENT DOCUMENTS

| | | |
|---|---|---|
| 1,356,591 | 10/1920 | Baumann . |
| 1,381,823 | 6/1921 | Griffin . |
| 2,132,757 | 10/1938 | Paulson . |
| 4,147,007 | 4/1979 | Eppich ........................................ 52/570 |
| 4,368,553 | 1/1983 | Perry ......................................... 14/69.5 |
| 5,347,672 | 9/1994 | Everard et al. ........................... 14/69.5 |
| 5,446,937 | 9/1995 | Haskins ..................................... 14/69.5 |
| 5,564,962 | 10/1996 | Navarette Espinosa ................ 446/128 |
| 5,566,519 | 10/1996 | Almaraz-Miera ....................... 52/592.1 |

FOREIGN PATENT DOCUMENTS 1243589  6/1967  Germany .

Primary Examiner—James A. Lisehora
Attorney, Agent, or Firm—Arthur F Zobal

[57] ABSTRACT

The dockboard in one embodiment includes three upper members and two lower members which can be stored and shipped unassembled and readily assembled in the field for use. Each of the members includes a plurality of spaced apart locking members extending from one side between opposite side edges. The locking members are spaced apart from each other between opposite support edges. The five members are assembled to form a dockboard by engaging selected locking members of the two lower members with selected locking members of the center upper member such that the center upper member overlaps adjacent support edges of the two lower members and sliding the center upper member and the two lower members together. Selected locking members of the two outer end upper members are engaged with the outer locking members of the two lower members and the two outer end upper members are slid onto the assembly to form the dockboard. Adjacent support edges of the upper and lower members have hook and slot side edge locking members to lock adjacent support edges of the upper members together and adjacent side edges of the lower members together.

16 Claims, 10 Drawing Sheets

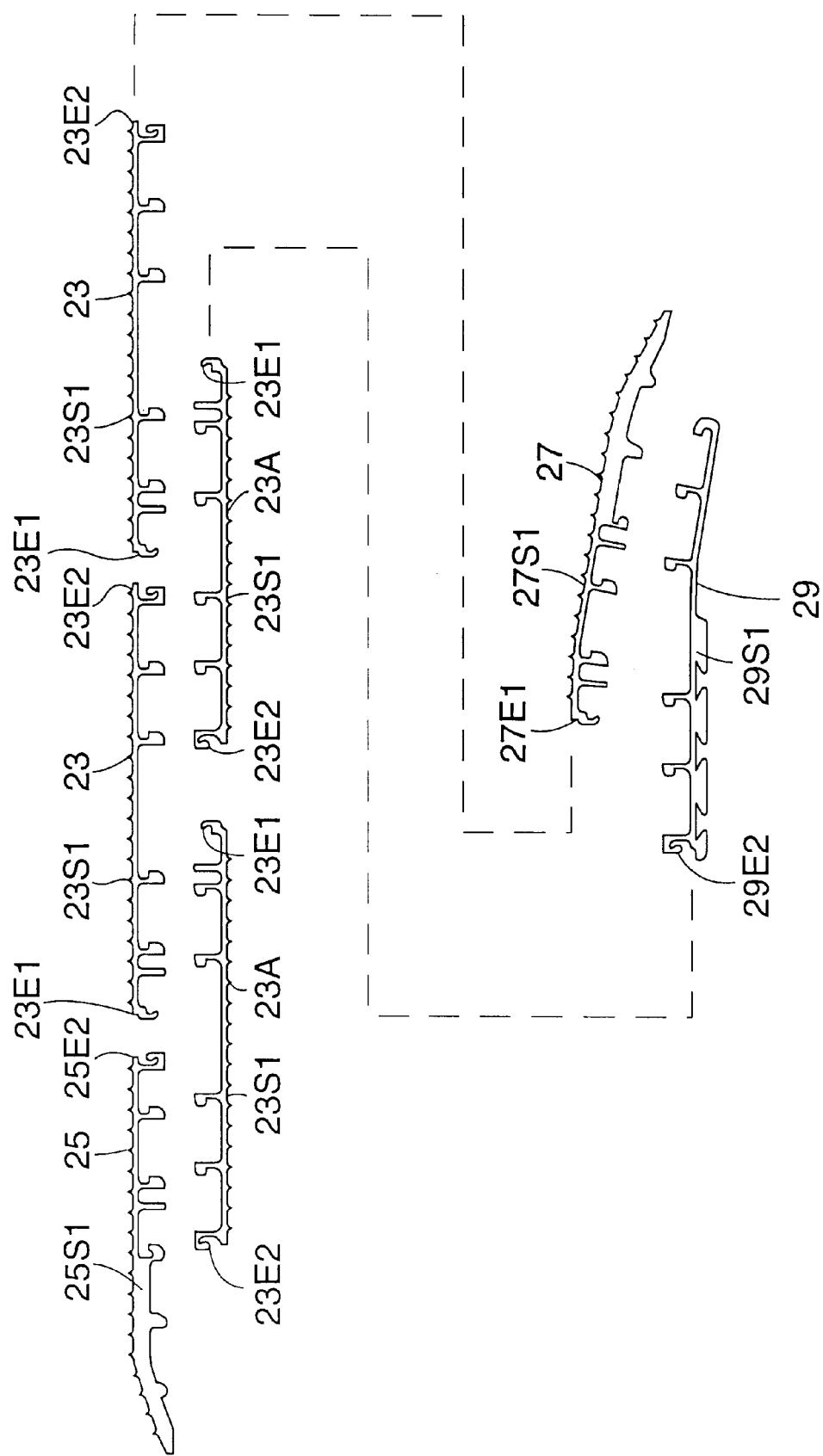

MODULAR DOCKBOARD

BACKGROUND OF THE INVENTION

1. Field of the Invention

The invention relates to a dockboard adapted to span the space between a loading dock and a truck or the like.

2. Description of the Prior Art

There are many types of dockboards used for unloading and loading material from a truck to a dock or vice versa. One type of dockboard is disclosed in U.S. Pat. No. 5,065, 468. The known dockboards are made up of components welded together which make storage and shipping costly.

SUMMARY OF THE INVENTION

It is an object of the invention to provide a dockboard that can be shipped unassembled and assembled in the field in order to facilitate storage and shipping.

The dockboard in one embodiment comprises three upper members and two lower members which can be stored and shipped unassembled and readily assembled in the field for use. Each of the members comprises a plurality of spaced apart locking means extending from one side between opposite side edges. The locking means are spaced apart from each other between opposite support edges. The five members are assembled to form a dockboard by engaging selected locking means of the two lower members with selected locking means of the center upper member such that the center upper member overlaps adjacent support edges of the two lower members and sliding the center upper member and the two lower members together. Selected locking means of the two outer end upper members are engaged with the outer locking means of the two lower members and the two outer end upper members are slid onto the assembly to form the dockboard.

Adjacent support edges of the members have hook and slot side edge locking means to lock adjacent support edges of the members together.

In the above embodiment, the center upper member and one of the lower members are substantially identical.

In other embodiments the dockboard may be formed of additional upper and lower members for example four upper members and three lower members assembled together in a similar manner. In this embodiment two upper members and two lower members may be substantially identical to each other.

BRIEF DESCRIPTION OF THE DRAWINGS

FIG. 8 is a view of the bottom of one of the members and FIG. 9 is a view of the top of the member of FIG. 8. In FIGS. 5–9 each of the members is shown in a split position.

FIG. 13 is an exploded view of another embodiment of the dockboard of the invention.

DESCRIPTION OF THE PREFERRED EMBODIMENT

Figure 1:
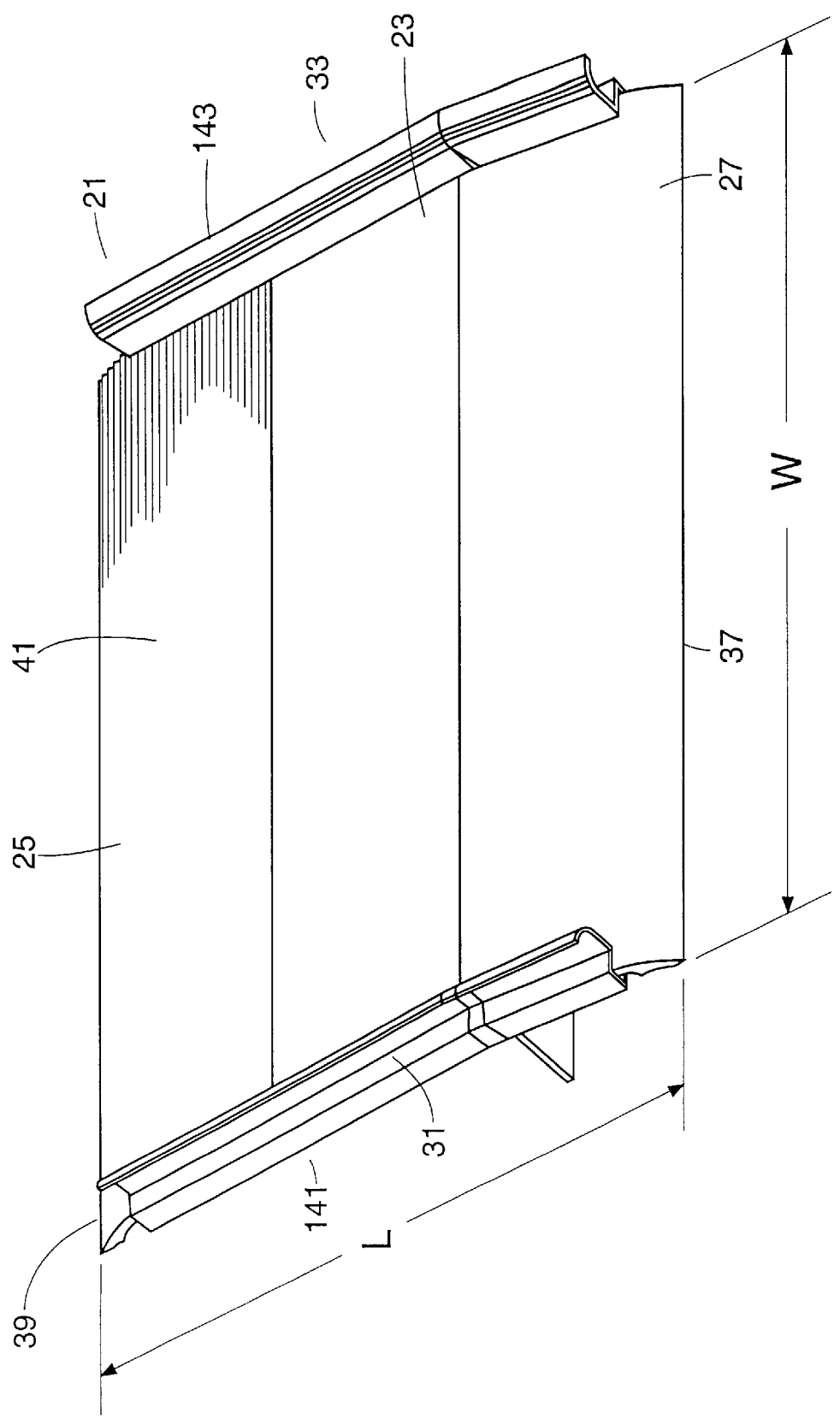
FIG. 1 is an isometric view of the top of one embodiment of the dockboard of the invention.
Figure 2:
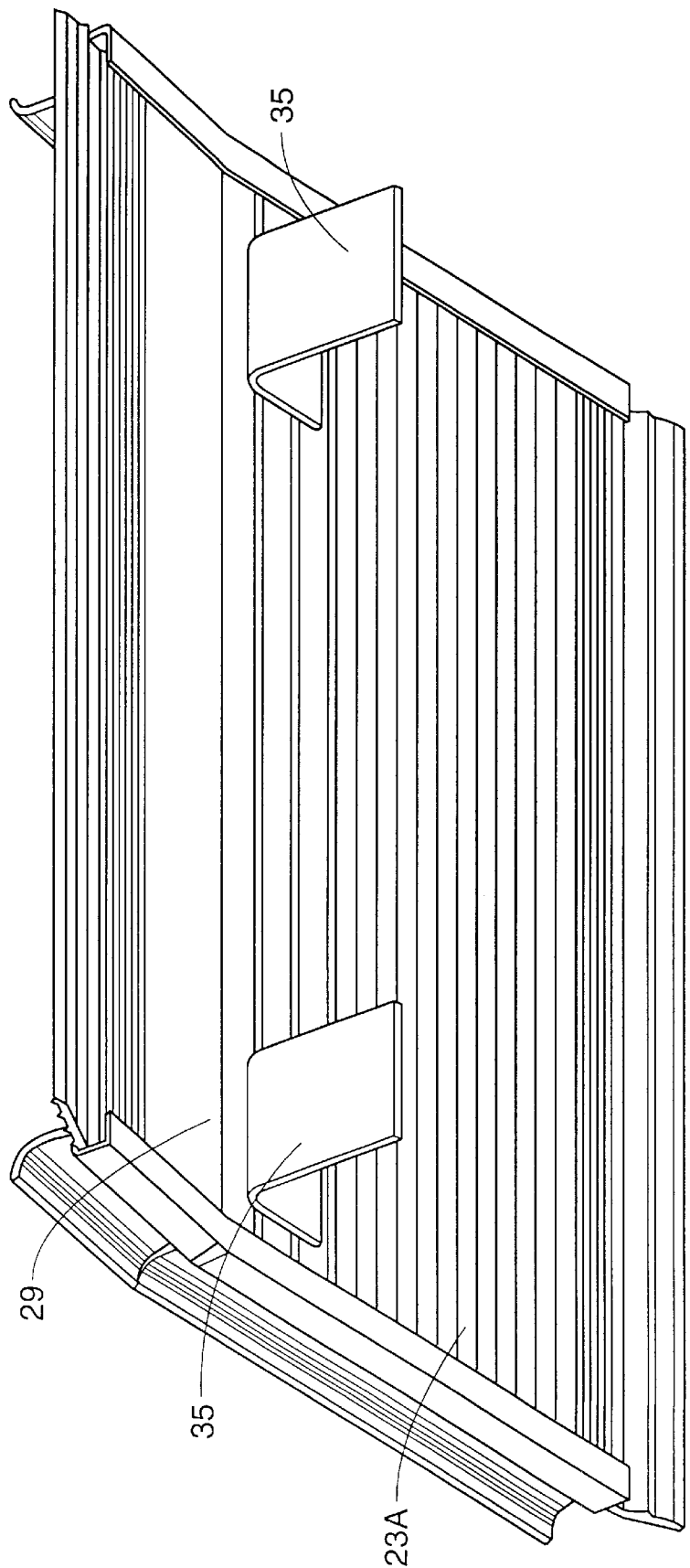
FIG. 2 is an isometric view of the bottom of the dockboard of FIG. 1.

Referring now to FIGS. 1–4 the dockboard shown is identified by reference numeral 21. It is formed of three rectangular shaped upper metal members or panels 23, 25, and 27 and two rectangular shaped lower metal members or panels 23A and 29. Panels 23 and 23A are substantially identical to each other. The dockboard has curb edges 31 and 33 coupled to its side edges along its length L and two legs or anchor plates 35 coupled to its bottom at one end along its width W. In use, the ends 37 and 39 are placed on the dock and truck floor or vice versa to support the dockboard to allow movement of workers and/or equipment on its top surface 41 between the truck and the dock. The anchors 35 may be used to engage the truck or dock edge to stabilize the dockboard and prevent it from slipping.

The members 23, 25, 27, 23A and 29 preferably are formed of extruded aluminium. Each of the members 23, 25, 27, 23A, and 29 are rectangular in shape as seen as seen from the top and bottom of the assembled dockboard.

Figure 3:
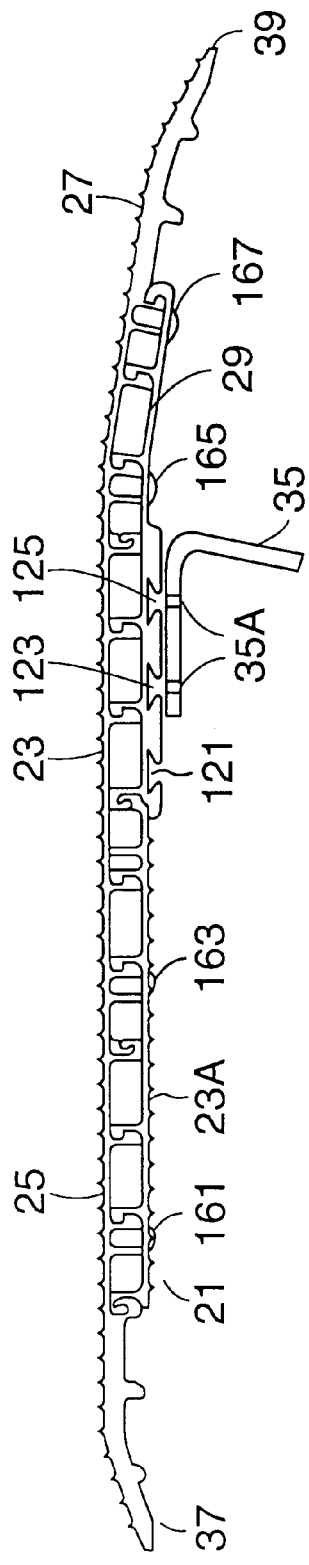
FIG. 3 is a side edge view of the dockboard of FIG. 1 and 2 without the curb edges.
Figure 4:
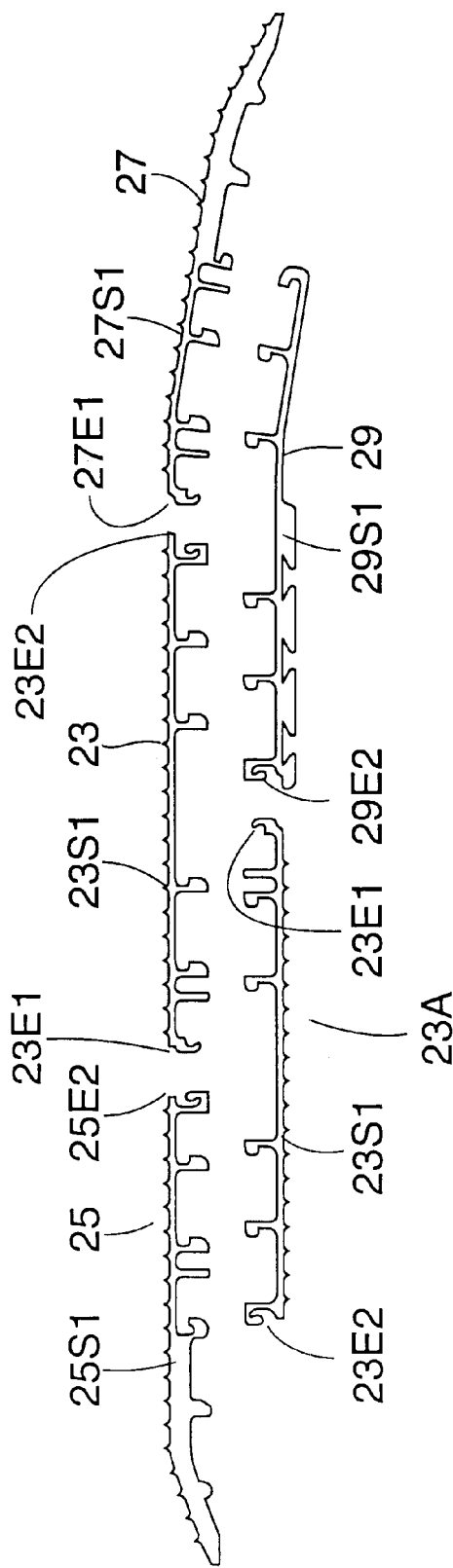
FIG. 4 is an exploded view of the components of FIG. 3.
Figure 5:
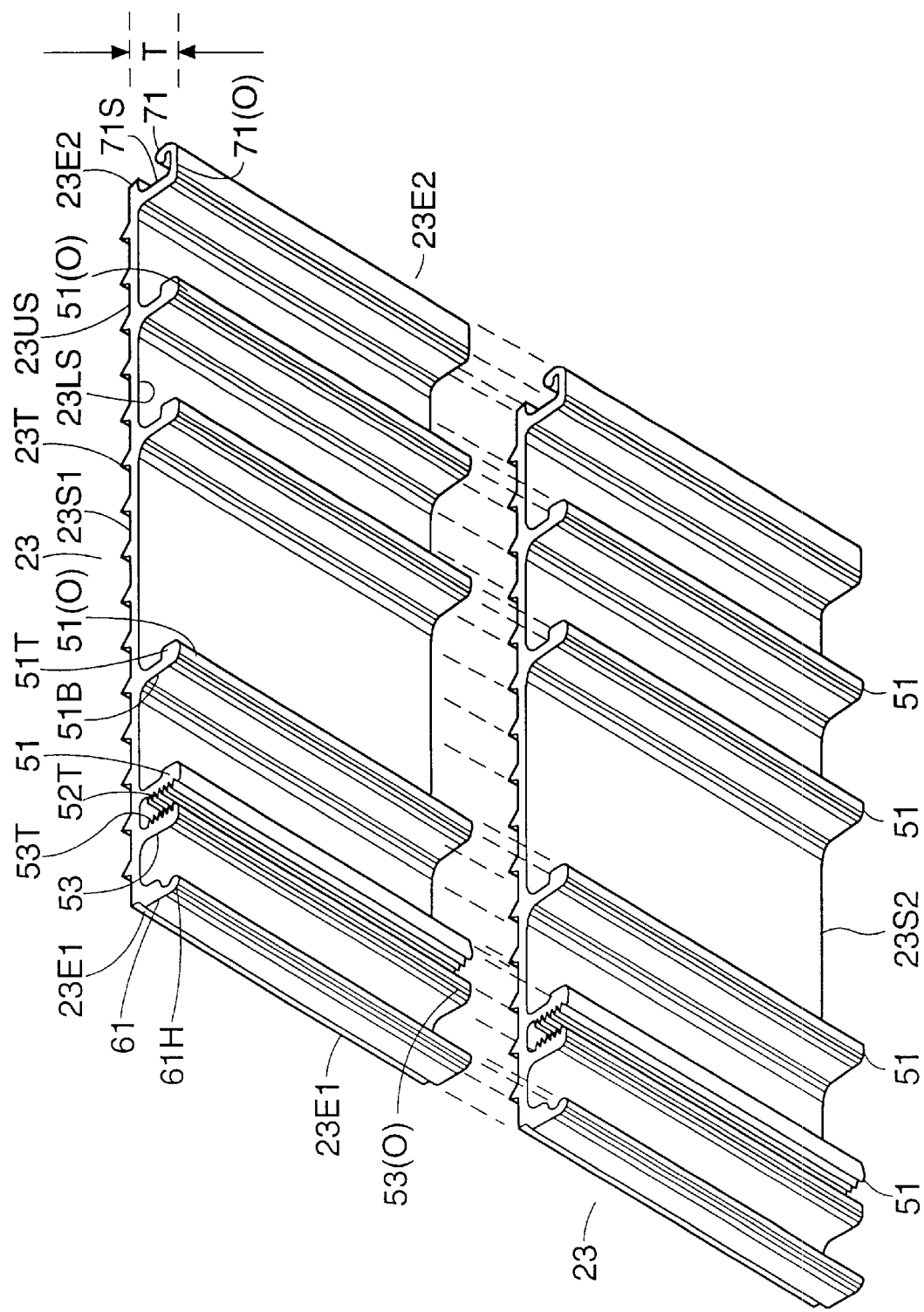
FIGS. 5–9 are isometric views of the four different members of FIGS. 3 and 4.

Referring to FIGS. 3, 4, and 5, member 23 has two parallel support edges 23E1 and 23E2 and two parallel side edges 23S1 and 23S2 which are perpendicular to edges 23E1 and 23E2. Member 23 has an upper side 23US with spaced apart parallel treads 23T extending between its side edges 23S1 and 23S2. Member 23 also has a lower side 23LS with a plurality of locking members 51 extending from the side 23LS between side edges 23S1 and 23S2. Each of the locking members 51 has a base portion 51B connected to the side 23LS and a transverse portion 51T with a space located between the transverse portion 51T and the side 23LS. All of the transverse portions 51T extend in the same direction. The member 23 also has a locking member 61 with a hook 61H at its edge 23E1 and which extends between side edges 23S1 and 23S2 and a locking member 71 with a slot 71S at its edge 23E2 and which extends between side edges 23S1 and 23S2. The slot 71S conforms with the hook 61H. The left most locking 51 of member 23 has elongated parallel threads 52T formed on its side facing edge 23E1. An extension 53 coupled to the side 23LS has elongated parallel threads 53T on its side facing threads 52T.

Figure 6:
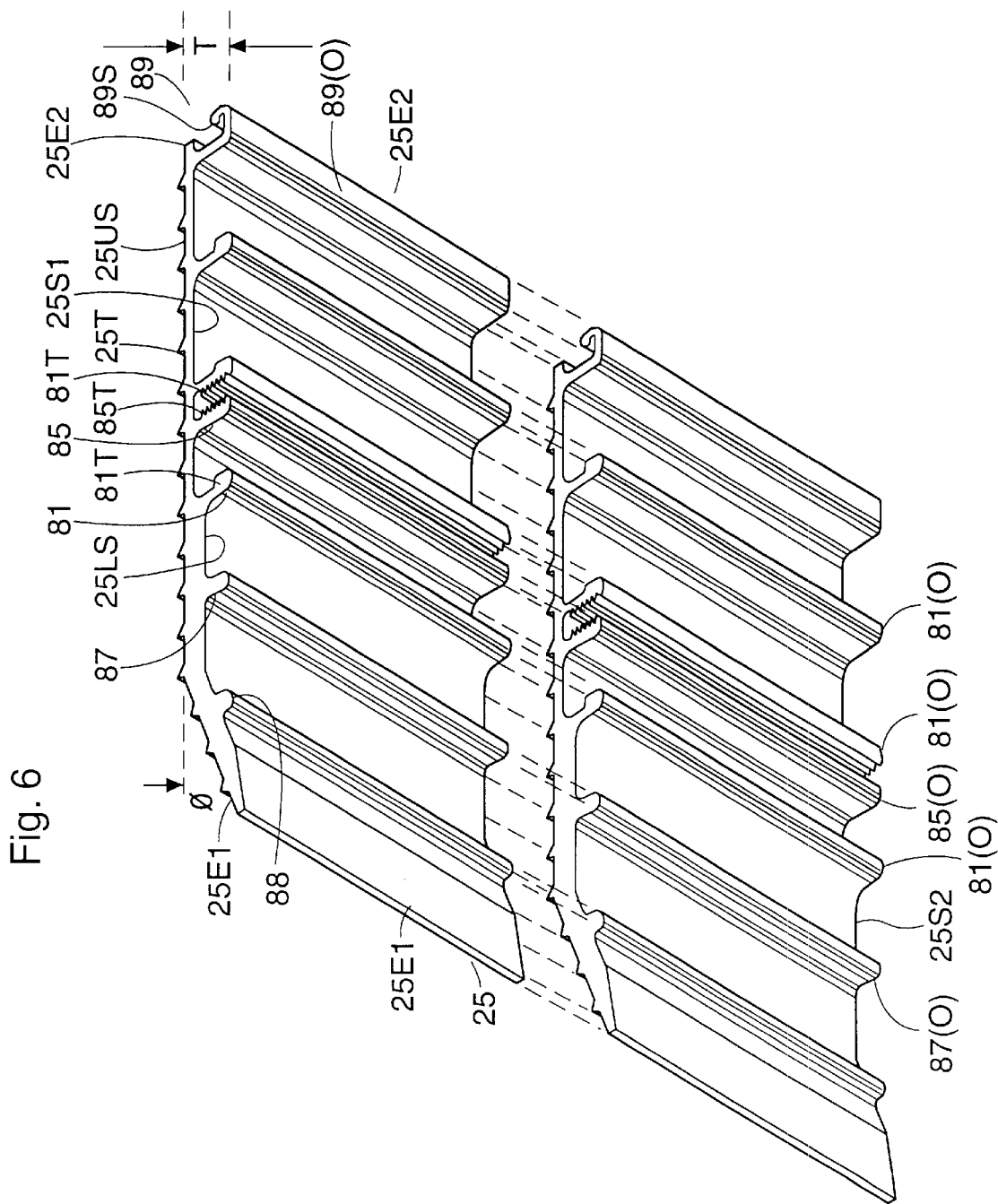

Referring to FIG. 6, member 25 has two parallel support edges 25E1 and 25E2 and two parallel side edges 25S1 and 25S2 which are perpendicular to edges 25E1 and 25E2. Edge 25E1 forms end 37. Member 25 has an upper side 25US with spaced apart parallel threads 25T extending between its side edges 25S1 and 25S2. Member 25 also has a lower side 25LS with a plurality of locking members 81 extending from the side 25LS between side edges 25S1 and 25S2. Each of the locking members 81 has a base portion 81B connected to the side 25LS and a transverse portion 81T with a space located between the transverse portion 81T and the side 25LS. All of the transverse portions 81T extend in the same direction. The member 25 also has a locking member 89 with a slot 89(S) at its edge 25E2 which extends between side edges 25S1 and 25S2. Extensions 85, 87, and 88 also are coupled to side 25LS. Elongated parallel threads 85T are formed on member 85 and elongated parallel threads 81T are formed on member 81 next to member 85 such that the threads 81T and 85T face each other. In FIG. 6, angle Ø is equal to 20°.

Figure 7:
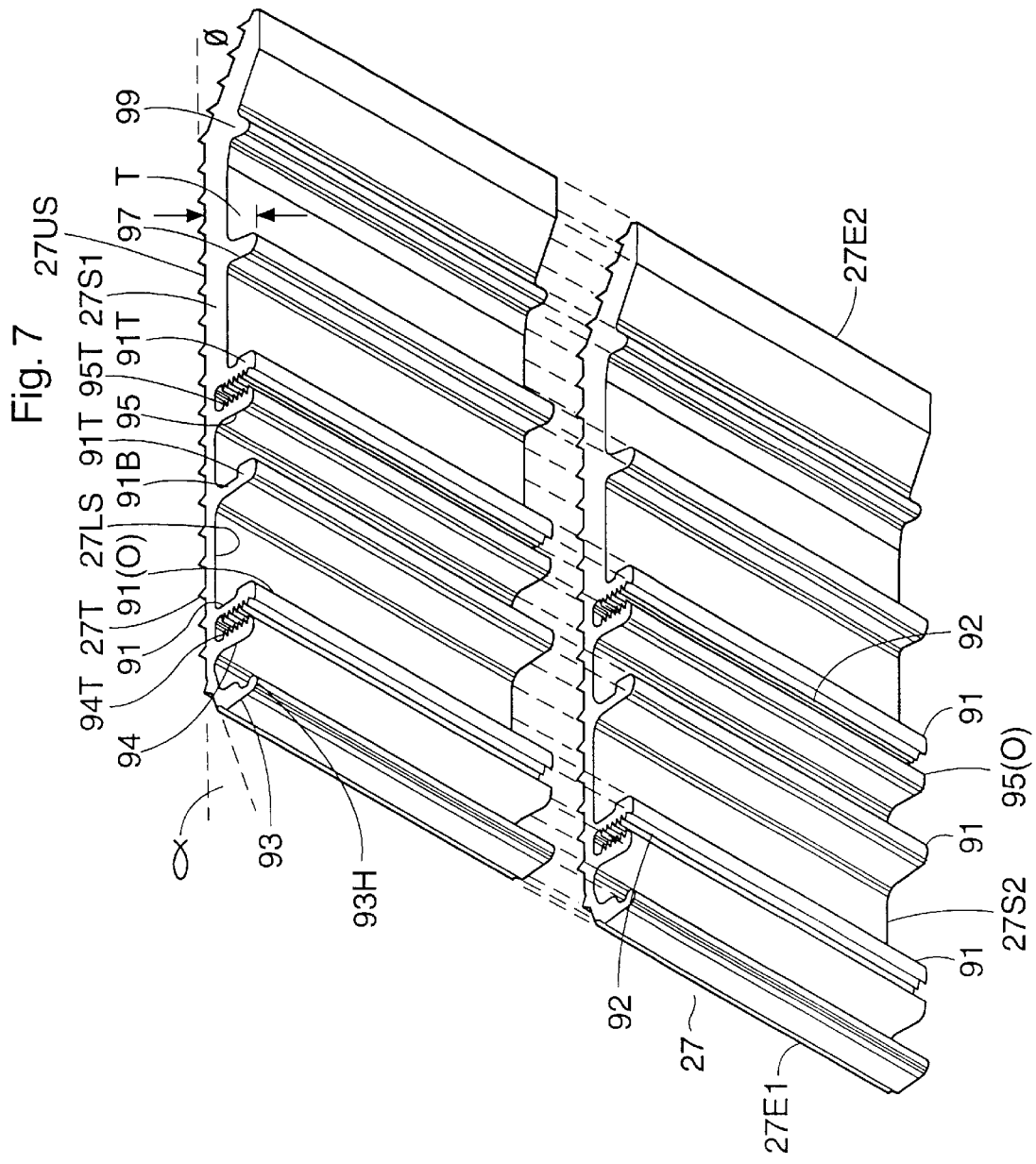

Referring to FIG. 7, member 27 has two parallel support edges 27E1 and 27E2 and two parallel side edges 27S1 and 27S2 which are perpendicular to edges 27E1 and 27E2. Edge 27E2 forms edge 39. Member 27 has an upper side 27US with spaced apart parallel threads 27T extending between its side edges 27S1 and 27S2. Member 27 also has a lower side 27LS with a plurality of locking members 91 extending from the side 27LS between side edges 27S1 and 27S2. Each of the locking members 91 has a base portion 91B and a transverse portion 91T with a space located between the transverse portion 91T and the side 27LS. All transverse portions 91T extend in the same direction. The member 27 also has a locking member 93 with a hook 93H at its edge 27E1 which extends between sides 27S1 and 27S2. Angles Ø and α are equal to about 20° and 11° respectively. Extensions 94, 95, 97, and 99 also are coupled to side 27LS. Elongated parallel threads 94T and 95T are formed on members 94 and 95 which face elongated parallel threads 92 formed on adjacent members 91 respectively.

Figure 8:
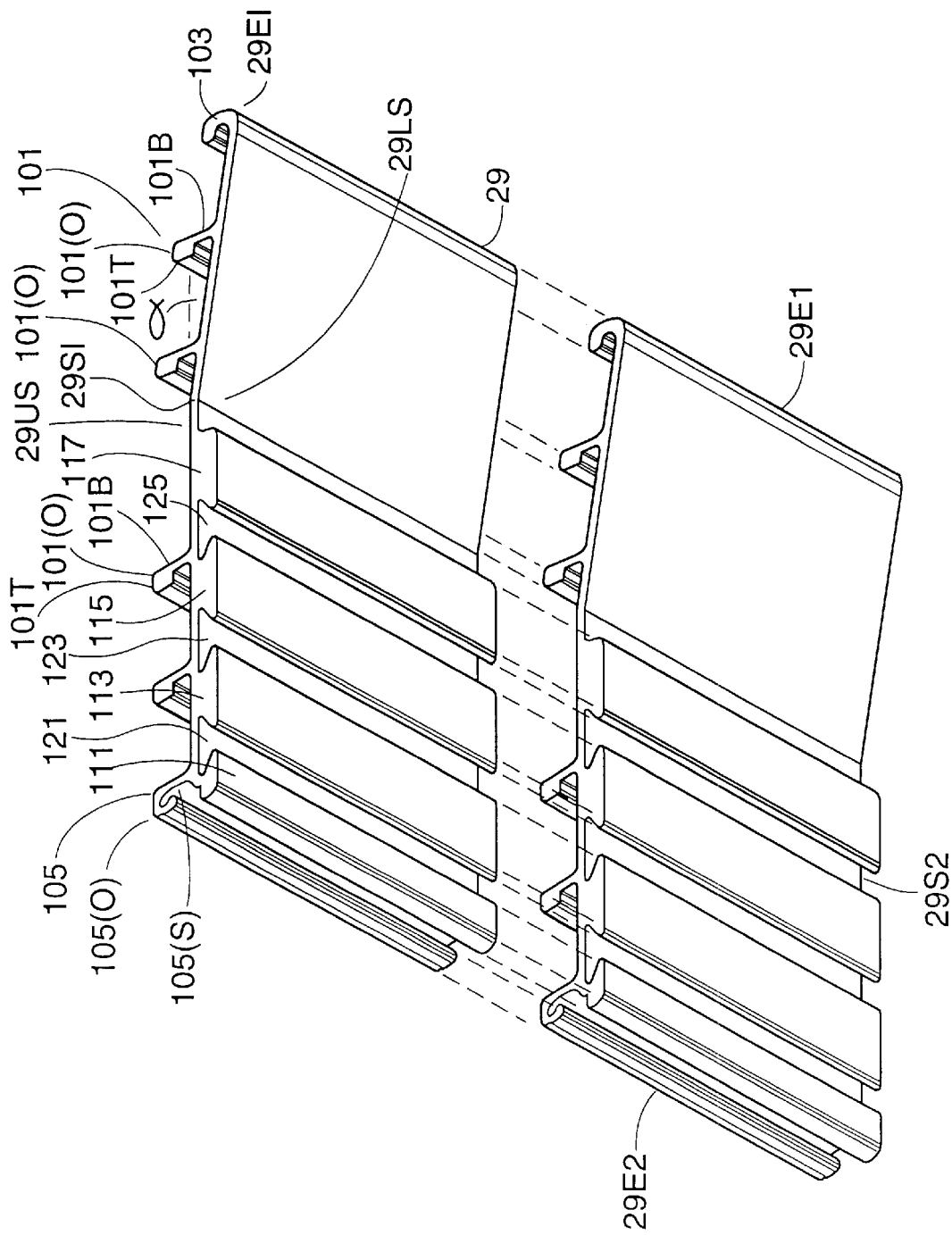
Figure 9:
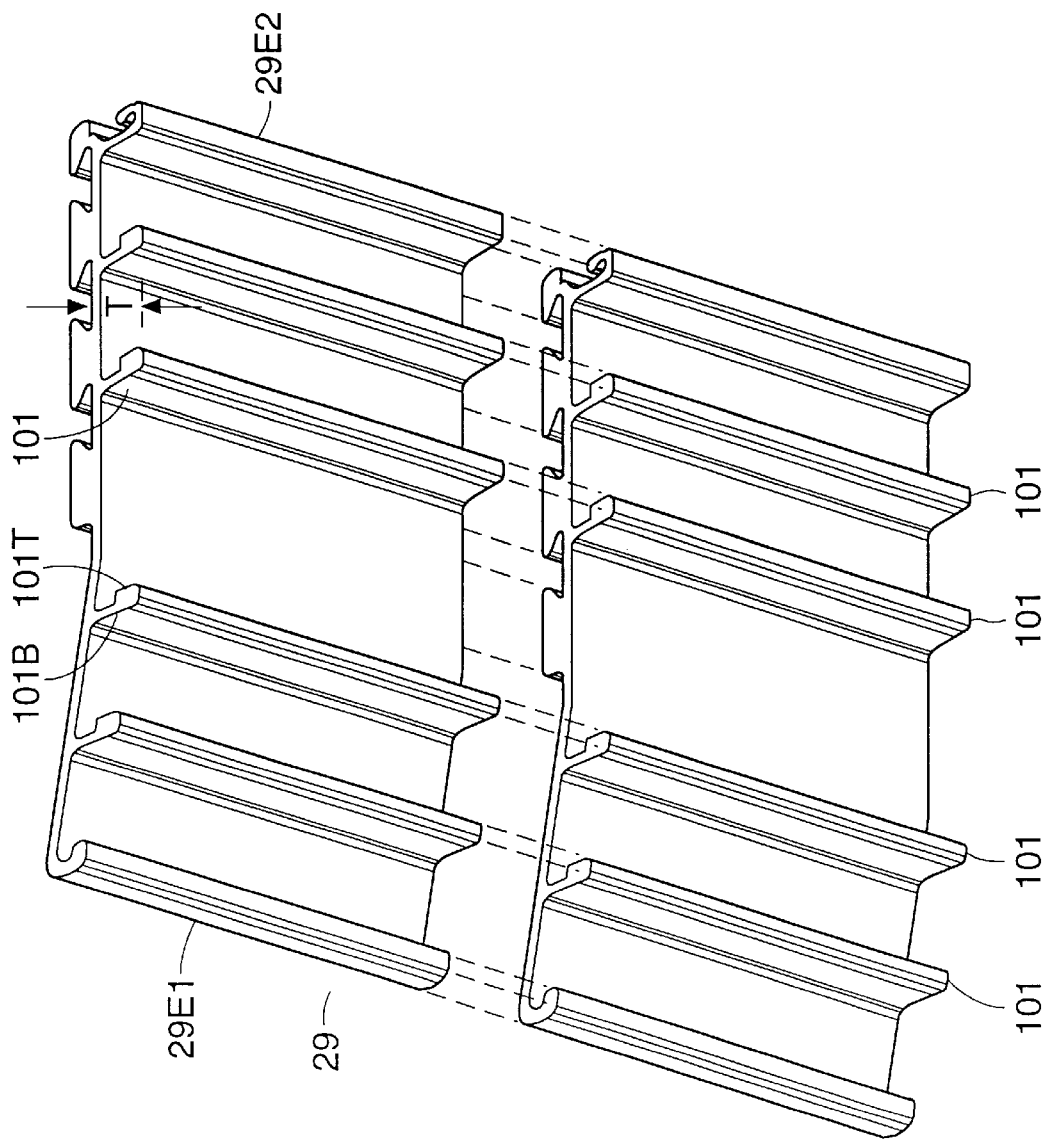

Referring to FIG. 8 and 9, the member 29 has two parallel support edges 29E1 and 29E2 and two parallel side edges 29S1 and 29S2 which are perpendicular to edges 29E1 and 29E2. Member 29 has an upper side 29US and a lower side 29LS. Side 29US has a plurality of locking members 101 extending between sides 29S1 and 29S2 each of which has a transverse portion 101T with a space located between the transverse portion 101T and side 29LS. All of the transverse portions 101T extend in the same direction. The member 29 has a hook shaped locking member 103 at its edge 29E1 and a locking member 105 with a slot 105S at its edge 29E2 which extend between side edges 29S1 and 29S2. Formed on side 29LS are four members 111, 113, 115, and 117 extending between sides 29S1 and 29S2 which form three elongated slots 121, 123, and 125. The angle α is equal to 11°.

All of the members 23, 25, 27, 23A and 29 have the same width W.

The members 23, 25, 27, 23A, and 29 can be assembled in the following manner to form the dockboard 21. The side 23S2 of member 23A is aligned with the side 29S1 of member 29 with the hook 61 of member 23A fitted into the slot 105S of member 29 and the two members are slid together such that sides 23S1 and 29S1 are in alignment. The side 23S2 of member 23 is aligned with the sides 23S1 and 29S1 of connected members 23A and 29 with the two right connecting portions 51T of member 23 are fitted under the two left connecting portions 101T of member 29 and the two left connecting portions 51T of member 23 fitted under the two right connecting portions 51T of member 23A in the positions shown in FIGS. 3 and 4 and the member 23 and members 23A and 29 slid together to positions such that sides 23S1, 23S1 and 29S1 of members 23, 23A and 29 are in alignment. In this position, the edges 51(O) of the appropriate locking members 51 of member 23 engage the sides 23LS and 29US of members 23A and 29 and the edges 101(O) and 51(O) of the appropriate locking members 101 and 51 of members 29 and 23A engage the lower side 23LS of member 23 as shown in FIG. 3. In addition the edge 53(O) of member 23 engages the side 23LS of member 23A; the edge 53(O) of member 23A engages the side 23LS of member 23; the edge 105(O) of member 29 engages the side 23LS of member 23; and the edge 71(O) of member 23 engages the side 29US of member 29.

The side 27S2 of member 27 is aligned with the sides 23S1 and 29S1 of members 23 and 29 with the hook 93H of member 27 fitted in the slot 71S of member 23 and with the transverse portions 91T of member 27 fitted under the transverse portions 101 T of the right members 101S of member 29 and the hook 103 of member 29 fitted under the far right transverse portion 91T of member 27 as seen in the positions of FIGS. 3 and 4 and the members 23, 27 and 29 slid together to positions where the sides 23S1, 27S1, and 29S1 are in alignment. In this position, the edges 101(O) of the right locking members 101 of member 29 engage the side 27LS of member 27 and the edges 91(O) of locking members 91 of member 27 engage the side 29US of member 29. In addition the edges 95(O) of member 27 engages the side 29US of member 29.

Finally side 25S2 of member 25 is aligned with sides 23S1 of members 23 and 23A and hook 61H of member 23 fitted in the slot 89S of member 25 and the transverse portions 81T of the member 25 fitted under the transverse portions 51T of the left members 51 of member 23A and the member 25, 23, and 23A are slid together until their sides 25S1, and 23S1 are in alignment to form the structure of FIG. 3. In this position the edges 81(O) and 85(O) of member 25 engage the side 23LS of member 23A and the edges 51(O) of left members 51 of member 23A engage the side 25LS of member 25 as seen in FIG. 3. In addition the edge 71(O) of member 23A engages the side 25LS of member 25.

Bolts 161, 163, 165, 167 are fitted through apertures (not shown) formed through members 23A and 29 and screwed to the threads 85T, 81T; 53T, 52T; 94T, 92; and 95T, 92 of members 25, 23, and 27 respectively to securely hold the five members 23, 23A, 25, 27, and 29 in place. For purposes of clarity, these threads are not shown in FIGS. 3 and 4.

The heads 131H of two bolts 131 of two pairs of bolts are slid into two of the slots 121, 123, or 123, 125 to desired spaced apart positions and the two legs 35 are attached to the shafts 131S of two pairs of bolts 131 with nuts. Each of the legs 35 has two apertures 35A formed therethrough for receiving the shafts 131 of two of the bolts. Thus, for example two bolts 131 in slots 121, 123 are used to secure a leg 35 to the member 21 and two other bolts in slots 121, 123 are used to secure a second leg 35 to the member 21.

Figure 11:
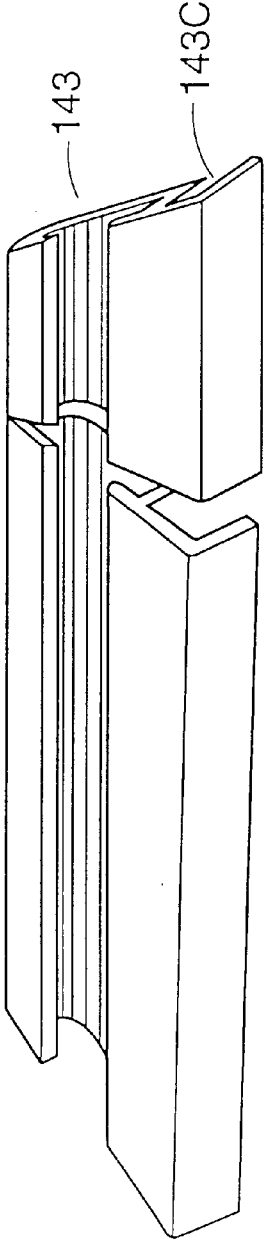
FIGS. 11 and 12 are isometric views of curb edges shown in FIGS. 1 and 2.
Figure 12:
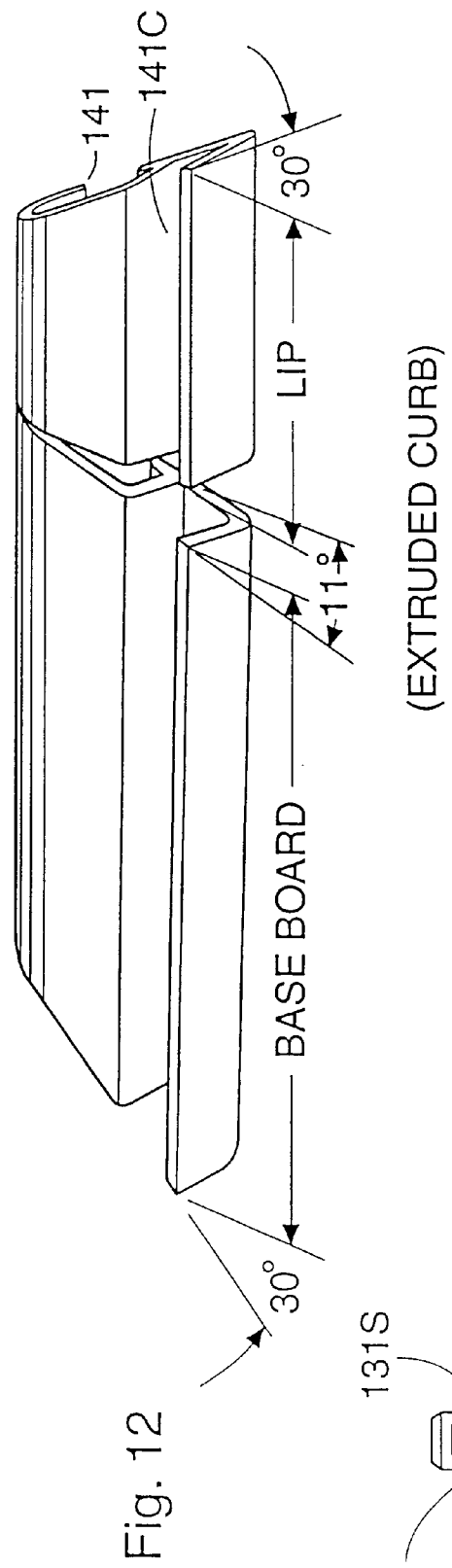
Figure 10:
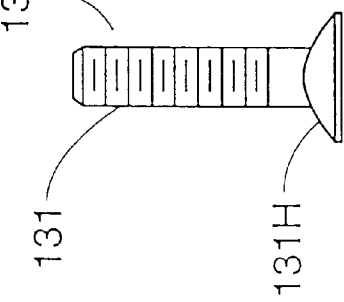
FIG. 10 is a bolt used for assembling the legs to the dockboard of the invention.

Two curbs 141 and 143 of the type shown in FIGS. 11 and 12 are attached to the member 21 as shown in FIG. 1. The curbs 141 and 143 are formed to produce a 11° bend angle. The curbs have channels 141C and 143C which receives a proton of the side edges of the member 21. The curbs 141 and 143 are welded to the side edges of the member 21.

In one embodiment, each of the members 23, 23A, 25, 27 and 29 has a width of about one foot and a length of about 4 feet. The dimension T of each of the four members 23, 23A, 27, and 29 may be of the order of one inch.

Referring to FIG. 13, the dockboard shown includes seven panel members: member 25, two members 23, and member 27 at the top and two members 23A and member 29 at the bottom. Member 25 and the left member 23 are connected together and to the left member 23A. The right member 23 is connected to the left member 23 and to member 27. The right member 23A is connected to the left member 23A and to the left and right member 23 an to member 29; and members 27 and 29 are connected together.

I claim:

1. A dockboard comprising:
   at least three upper members and two lower members with said upper members comprising first, second, and third rectangular shaped upper members and said lower members comprising first and second rectangular shaped lower members,
   each of said members having spaced apart first and second support edges and spaced apart first and second side edges with said side edges being generally transverse to said first and second support edges, each of said members having first and second opposite sides with a plurality of spaced apart generally parallel body locking means formed on said first side of each of said members and which extend between said first and second side edges of each of said members, said first and second lower members being adapted to have selected ones of their body locking means removably engage selected ones of said body locking means of said first upper member such that said first upper member overlaps adjacent support edges of said first and second lower members with selected ones of said body locking means of said first lower member removably engaging selected ones of said body locking means of said second upper member and selected ones of said body locking means of second lower member removably engaging selected ones of said body locking means of said third upper member such that first lower member overlaps adjacent support edges of said first and second upper members and said second lower member overlaps adjacent support edges of said first and third upper members to form a dockboard with a supporting surface defined by said second sides of said first, second, and third upper members, said first upper member has first and second types of edge locking means at its first and second support edges respectively; said second upper member has said second type of edge locking means at its second support edge for removably engaging said first type of edge locking means of said first upper member; and said third upper member has said first type of edge locking means at its first support edge for removably engaging said second type of edge locking means of said first upper member, said first lower member has said first type of edge locking means at its first support edge and said second lower member has said second type of edge locking means at its second support edge for removably engaging said first type of edge locking means of said first lower member.

2. The dockboard of claim 1, wherein:

said first upper member and one of said lower members are substantially identical to each other.

3. The dockboard of claim 1, wherein:

each of said body locking means of each of said members comprises a base portion secured to its said first side with a transverse portion extending from said base portion at a position spaced from its said first side with all of said transverse portions extending in the same direction from their base portions, when said first upper member is removably coupled to said first and second lower members; said second upper member is removably coupled to said first lower member; and said third upper member is removably coupled to said second lower member, said transverse portions are located such that selected ones said transverse portions of said first upper member engage selected ones of said transverse portions of said first and second lower members; selected ones of said transverse portions of said second upper member engage selected ones of said transverse portions of said first lower member; and selected ones of said transverse portions of said third upper member engage selected ones of said transverse portions of said second lower member.

4. The dockboard of claim 3, wherein:

selected ones of said transverse portions of said body locking means of said first upper member are positioned to engage selected ones of said transverse portions of said body locking means of said first and second lower members by aligning said second side edge of said first upper member with said first side edges of said first and second lower members at positions such that said transverse portions of said body locking means of said first upper member face in a given direction and said transverse portions of said body locking means of said first and second lower members face in a direction opposite said given direction with said first upper member overlapping said first and second support edges of said first and second lower members and engaging selected ones of said transverse portions of said body locking means of said first and second lower members and moving said first upper member relative to said first and second lower members in directions such that said first side edge of said first upper member and said first side edges of said first and second lower members move toward each other.

5. The dockboard of claim 4, wherein:

selected ones of said transverse portions of said body locking means of said second and third upper members are positioned to engage selected ones of said transverse portions of said body locking means of said first and second lower members respectively by aligning said second side edges of said second and third upper member with said first side edges of said first and second lower members at positions such that said transverse portions of said body locking means of said second and third upper members face in said given direction and said transverse portions of said body locking means of said first and second lower members face in a direction opposite said given direction with said first lower member overlapping said first and second support edges of said first and second upper members and with said second lower member overlapping said second and first support edges of said first and third upper members and engaging selected ones of said transverse portions of said body locking means of said second and third upper members with selected ones of said transverse portions of said body locking means of said first and second lower members respectively and moving said second and third upper members relative to said first and second lower members in directions such that said first side edges of said second and third upper members and said first side edges of said first and second lower members move toward each other.

6. The dockboard of claim 5, wherein:

each of said first type of edge locking means comprises a hook shaped member and each of said second type of edge locking means comprises a hook shaped slot formed in said second type of edge locking means for receiving a hook shaped member of an adjacent member.

7. The dockboard of claim 6, wherein said first upper member and one of said lower members are substantially identical to each other.

8. A dockboard comprising:

at least three upper members and two lower members with said upper members comprising first, second, and third rectangular shaped upper members and said lower members comprising first and second rectangular shaped lower members, each of said members having spaced apart first and second support edges and spaced apart first and second side edges with said side edges being generally transverse to said first and second support edges, each of said members having first and second opposite sides with a plurality of spaced apart generally parallel body locking means formed on said first side of each of said members and which extend between said first and second side edges of each of said members, said first and second lower members being adapted to have selected ones of their body locking means removably engage selected ones of said body locking means of said first upper member such that said first upper member overlaps adjacent support edges of said first and second lower members with selected ones of said body locking means of said first lower member removably engaging selected ones of said body locking means of said second upper member and selected ones of said body locking means of second lower member removably engaging selected ones of said body locking means of said third upper member such that first lower member overlaps adjacent support edges of said first and second upper members and said second lower member overlaps adjacent support edges of said first and third upper members to form a dockboard with a supporting surface defined by said second sides of said first, second, and third upper members, each of said body locking means of each of said members comprises a base portion secured to its said first side with a transverse portion extending from said base portion at a positions spaced from its said first side, when said first upper member is removably coupled to said first and second lower members; said second upper member is removably coupled to said first lower member; and said third upper member is removably coupled to said second lower member, said transverse portions are located such that selected ones of said transverse portions of said first upper member engage selected ones of said transverse portions of said first and second lower members; selected ones of said transverse portions of said second upper member engage selected ones of said transverse portions of said first lower member; and selected ones of said transverse portions of said third upper member engage selected ones of said transverse portions of said second lower member, said first upper member has first and second types of edge locking means at its first and second support edges respectively; said second upper member has said second type of edge locking means at its second support edge for removably engaging said first type of edge locking means of said first upper member; and said third upper member has said first type of edge locking means at its first support edge for removably engaging said second type of edge locking means of said first upper member, said first lower member has said first type of edge locking means at its first support edge and said second lower member has said second type of edge locking means at its second support edge for removably engaging said first type of edge locking means of said first lower member.

9. The dockboard of claim 8, wherein:

each of said first type of edge locking means comprises a hook shaped member and each of said second type of edge locking means comprises a hook shaped slot formed in said second type of edge locking means for receiving a hook shaped member of an adjacent member.

10. A dockboard having a given width and a given length comprising:

at least three upper members and two lower members with said upper members comprising first, second, and third rectangular shaped upper members and said lower members comprising first and second rectangular shaped lower members, each of said members having spaced apart first and second support edges and spaced apart first and second side edges with said side edges being generally transverse to said first and second support edges, the distance between said first and second side edges of each of said members being about equal to said given width, each of said members having first and second opposite sides with a plurality of spaced apart generally parallel body locking means being formed on said first side of each of said members and which extend between said first and second side edges of each of said members, said first and second lower members being adapted to have selected ones of their body locking means removably engage selected ones of said body locking means of said first upper member such that said first upper member overlaps adjacent support edges of said first and second lower members with selected ones of said body locking means of said first lower member removably engaging selected ones of said body locking means of said second upper member and selected ones of said body locking means of second lower member removably engaging selected ones of said body locking means of said third upper member such that first lower member overlaps adjacent support edges of said first and second upper members and said second lower member overlaps adjacent support edges of said first and third upper members to form a dockboard with a supporting surface defined by said second sides of said first, second, and third upper members, said first upper member has first and second types of edge locking means at its first and second support edges respectively; said second upper member has said second type of edge locking means at its second support edge for removably engaging said first type of edge locking means of said first upper member; and said third upper member has said first type of edge locking means at its first support edge for removably engaging said second type of edge locking means of said first upper member, said first lower member has said first type of edge locking means at its first support edge and said second lower member has said second type of edge locking means at its second support edge for removably engaging said first type of edge locking means of said first lower member.

11. The dockboard of claim 10, wherein:

said first upper member and one of said lower members are substantially identical to each other.

12. The dockboard of claim 11 wherein:

each of said first and second lower members are adapted to have at least two of their body locking means removably engage at least two of said body locking means of said first upper member such that said first upper member overlaps adjacent support edges of said first and second lower members with at least two of said body locking means of said first lower member removably engaging at least two of said body locking means of said second upper member and at least two of said body locking means of second lower member removably engaging at least two of said body locking means of said third upper member such that first lower member overlaps adjacent support edges of said first and second upper members and said second lower member overlaps adjacent support edges of said first and third upper members to form said dockboard.

13. The dockboard of claim 10 wherein:

each of said first and second lower members are adapted to have at least two of their body locking means removably engage at least two of said body locking means of said first upper member such that said first upper member overlaps adjacent support edges of said first and second lower members with at least two of said body locking means of said first lower member removably engaging at least two of said body locking means of said second upper member and at least two of said body locking means of second lower member removably engaging at least two of said body locking means of said third upper member such that first lower member overlaps adjacent support edges of said first and second upper members and said second lower member overlaps adjacent support edges of said first and third upper members to form said dockboard.

14. A dockboard comprising:

at least three upper members and two lower members with said upper members comprising first, second, and third rectangular shaped upper members and said lower members comprising first and second rectangular shaped lower members, each of said members having spaced apart first and second support edges and spaced apart first and second side edges with said side edges being generally transverse to said first and second support edges, each of said members having first and second opposite sides with a plurality of spaced apart generally parallel body locking means being formed on said first side of each of said members and which extend between said first and second side edges of each of said members, each of said first and second lower members being adapted to have at least two of their body locking means removably engage at least two of said body locking means of said first upper member such that said first upper member overlaps adjacent support edges of said first and second lower members with at least two of said body locking means of said first lower member removably engaging at least two of said body locking means of said second upper member and at least two of said body locking means of second lower member removably engaging at least two of said body locking means of said third upper member such that said first lower member overlaps adjacent support edges of said first and second upper members and said second lower member overlaps adjacent support edges of said first and third upper members to form a dockboard with a supporting surface defined by said second sides of said first, second, and third upper members, said first upper member has first and second types of edge locking means at its first and second support edges respectively; said second upper member has said second type of edge locking means at its second support edge for removably engaging said first type of edge locking means of said first upper member; and said third upper member has said first type of edge locking means at its first support edge for removably engaging said second type of edge locking means of said first upper member, said first lower member has said first type of edge locking means at its first support edge and said second lower member has said second type of edge locking means at its second support edge for removably engaging said first type of edge locking means of said first lower member.

15. The dockboard of claim 14, wherein:

said first upper member and one of said lower members are substantially identical to each other.

16. An apparatus for spanning the space between spaced apart means, said apparatus having a given width and a given length comprising:

at least three upper members and two lower members with said upper members comprising first, second, and third rectangular shaped upper members and said lower members comprising first and second rectangular shaped lower members, each of said members having spaced apart first and second support edges and spaced apart first and second side edges with said side edges being generally transverse to said first and second support edges, the distance between said first and second side edges of each of said members being about equal to said given width, each of said members having first and second opposite sides with a plurality of spaced apart body locking means fixed to said first sides of each of said members, said first and second lower members being adapted to have selected ones of their body locking means removably engage selected ones of said body locking means of said first upper member such that said first upper member overlaps adjacent support edges of said first and second lower members with selected ones of said body locking means of said first lower member removably engaging selected ones of said body locking means of said second upper member and selected ones of said body locking means of second lower member removably engaging selected ones of said body locking means of said third upper member such that first lower member overlaps adjacent support edges of said first and second upper members and said second lower member overlaps adjacent support edges of said first and third upper members to form said apparatus with a supporting surface defined by said second sides of said first, second, and third upper members, said first upper member has edge locking means at its first and second support edges respectively; said second upper member has edge locking means at its second support edge for removably engaging said edge locking means at said first support edge of said first upper member; and said third upper member has edge locking means at its first support edge for removably engaging said edge locking means at said second support edge of said first upper member, said first lower member has edge locking means at its first support edge and said second lower member has edge locking means at its second support edge for removably engaging said edge locking means at said first support edge of said first lower member.

* * * * *